United States Patent [19]

Gobel et al.

[11] Patent Number: 4,906,112
[45] Date of Patent: Mar. 6, 1990

[54] MULTIROW BALL OR ROLLER BEARING OR COMBINED BALL/ROLLER BEARING

[75] Inventors: Dieter Gobel, Thundorf; Günter Herles, Dittelbrunn; Rudolf Schindler, Hambach, all of Fed. Rep. of Germany

[73] Assignee: FAG Kugelfischer Georg Schafer KGaA, Fed. Rep. of Germany

[21] Appl. No.: 251,568

[22] Filed: Sep. 30, 1988

[30] Foreign Application Priority Data

Oct. 1, 1987 [DE] Fed. Rep. of Germany ....... 3733190

[51] Int. Cl.[4] ..................... F16C 33/60; F16C 19/38
[52] U.S. Cl. .................................. 384/548; 384/455; 384/618; 384/622
[58] Field of Search ................................ 384/452–455, 384/548, 570, 590, 593, 604, 608, 609, 618–622, 613, 615, 617

[56] References Cited

U.S. PATENT DOCUMENTS

| 3,304,137 | 2/1967 | Strassberg | 384/455 |
| 4,422,697 | 12/1983 | Gugel et al. | 384/452 |
| 4,622,860 | 11/1986 | Canetti et al. | 384/593 X |
| 4,828,405 | 5/1989 | Sinner | 384/455 |

FOREIGN PATENT DOCUMENTS 988169  4/1965  United Kingdom ................ 384/455

*Primary Examiner*—Thomas R. Hannon
*Attorney, Agent, or Firm*—Ostrolenk, Faber, Gerb & Soffen

[57] ABSTRACT

A large antifriction bearing, wherein one of the inner ring parts or the outer ring parts are provided with axially extending, wide toothing. At least one or both of the inner and outer ring parts is divided into cooperating parts through the axis of the bearing. Each set of axially adjacent cooperating ring parts is in turn divided into circumferential segments, and the segments are circumferentially offset. The offset axially neighboring segments of cooperating ring parts are fastened together. One of the rings has its ring parts shaped for defining a U-shape in cross-section. The other ring has its ring parts shaped for defining a projecting portion that projects between the arms of the U-shape. The rolling elements of the bearing are disposed between the insides of the arms of the U-shaped part and the projection from the other part. Preferably the ring part having the teeth is U-shaped, although the other ring part may be U-shaped. Appropriate openings and recesses are defined in cooperating ring segments, and particularly may be defined in the facing surfaces of ring segments, so that the openings or recesses are aligned and connecting bolts or pins are disposed in the aligned openings or recesses.

20 Claims, 4 Drawing Sheets

MULTIROW BALL OR ROLLER BEARING OR COMBINED BALL/ROLLER BEARING

BACKGROUND OF THE INVENTION

The present invention relates to a bearing of large diameter and having wide toothing wherein the bearing is divided into ring parts which in turn are comprised of ring segments that are secured in shifted position.

A bearing of this type is described in Federal Republic of Germany Utility Model 18 97 209. There are a number of situations where it is advisable, for reasons of manufacture and assembly, to divide the rings of larger diameter bearings into segments and to connect them together in the manner indicated in the above reference publication. The concentricity of the ring parts assembled from segments is already substantially increased. However, problems can arise if the bearings are provided with a wide toothing, as is frequently necessary. Particularly with thin walled parts which are provided with teeth, deformations can occur, particularly in the regions at which there is no screwing together of facing ring segments.

SUMMARY OF THE INVENTION

The object of the present invention is to improve large antifriction bearings so that, even upon the application of a wide toothing to the bearing parts, the high precision of the tooth flanks, which is required for gearings, is retained.

The invention concerns an antifriction bearing, and particularly a large one, comprising the outer ring, an inner ring that is typically present in the bearing and of course rolling elements between the inner and outer rings. Preferably, each of the rings is divided through the axis of the bearing into a plurality of ring parts, on opposite axial ends of the bearing.

The invention is particularly concerned with the axially extending teeth that are defined either on the exterior surface of the outer ring or the interior surface of the inner ring.

Each of the ring parts is, in turn, divided into a plurality of partial circumferential segments. Those segments do not directly overlie each other, but instead their ends overlap. The adjacent ring segments of neighboring ring parts of a ring are axially connected to each other in their circumferentially shifted position. Axially direct connecting means accomplish this.

At least one set of the cooperating ring parts together define a generally U-shape cross-section viewed along the axis of the bearing. For example, the inner ring or the outer ring might have the U-shape. At least one of the other ring parts of the other ring has a projecting part extending between the arms of that U.

The rolling elements of the bearing are positioned inside the arms of the U and outside the projecting part of the other ring part.

In one preferred embodiment, the axial teeth are on the ring part that defines the U. In another embodiment, the teeth are on the ring part that projects between the arms of the U.

Because the ring segments of a ring part, and particularly the segments which are provided with the toothing, are of U-shape, they can grip around both sides of the other ring segments of the other ring part which face them. This enables screwing the tooth segments onto the two legs of the other ring segments. This assures that the tooth flanks remain parallel over their entire width and that unilateral load bearing and premature wear of the teeth do not result.

The same result is obtained if a transverse division is effected in the region of the toothing. Here, the ring segments which are connected to each other by axial grooves must have a somewhat larger diameter. On the other hand, attachment to other ring segments or the application of additional connecting elements can be dispensed with.

Upon manufacture, to simply obtain segments which are as precise as possible and which maintain an exact position with respect to each other, even on their ends which face each other, it is advisable in accordance with a further embodiment of the invention to make use of centering recesses between facing ring segments and centering means disposed in those recesses. Upon manufacture, only a closed ring is initially required. It is provided with a circular recess, or more usually a plurality of recesses, and is then divided into ring segments. A slot is produced upon the use of the customary cutting methods, such as milling. The introduction of a centering bolt into the two recesses, which are now of semicircular shape, provides very accurate positioning of the ring segments with respect to each other at their end surfaces in assembled condition, despite the slot. For sealing, it may be advisable to fill the slot with plastic or rubber.

The precision of the bearing segments with respect to each other can be increased by providing holes having tapered centering pins in addition to the axial screws. These holes precisely center the parts with respect to each other, while the screws produce a less accurate but inexpensive connection.

At the opposite axial side of the bearing opposite the side having the rolling members of the main load row, there are frequently provided rolling members of a support row. These shall be always under a small load, so that no disturbances in function occur. In order to achieve this, one race of the support row comprises divided ring segments which are connected shifted to each other and are spring loaded.

In order to obtain simple, inexpensive manufacture of the bearing races, the rim rings, in the case of rows of rollers arranged alongside of each other, are provided as segments which are separated from the bearing race and are screwed to it.

For better guidance of the cage or separator segments, it is further advisable to provide slide pieces on one or both sides between them and the races.

Other objects and features of the present invention will become apparent from the following description of preferred embodiments of the invention considered in conjunction with the accompanying drawings.

DESCRIPTION OF THE PREFERRED EMBODIMENTS

Figure 1:
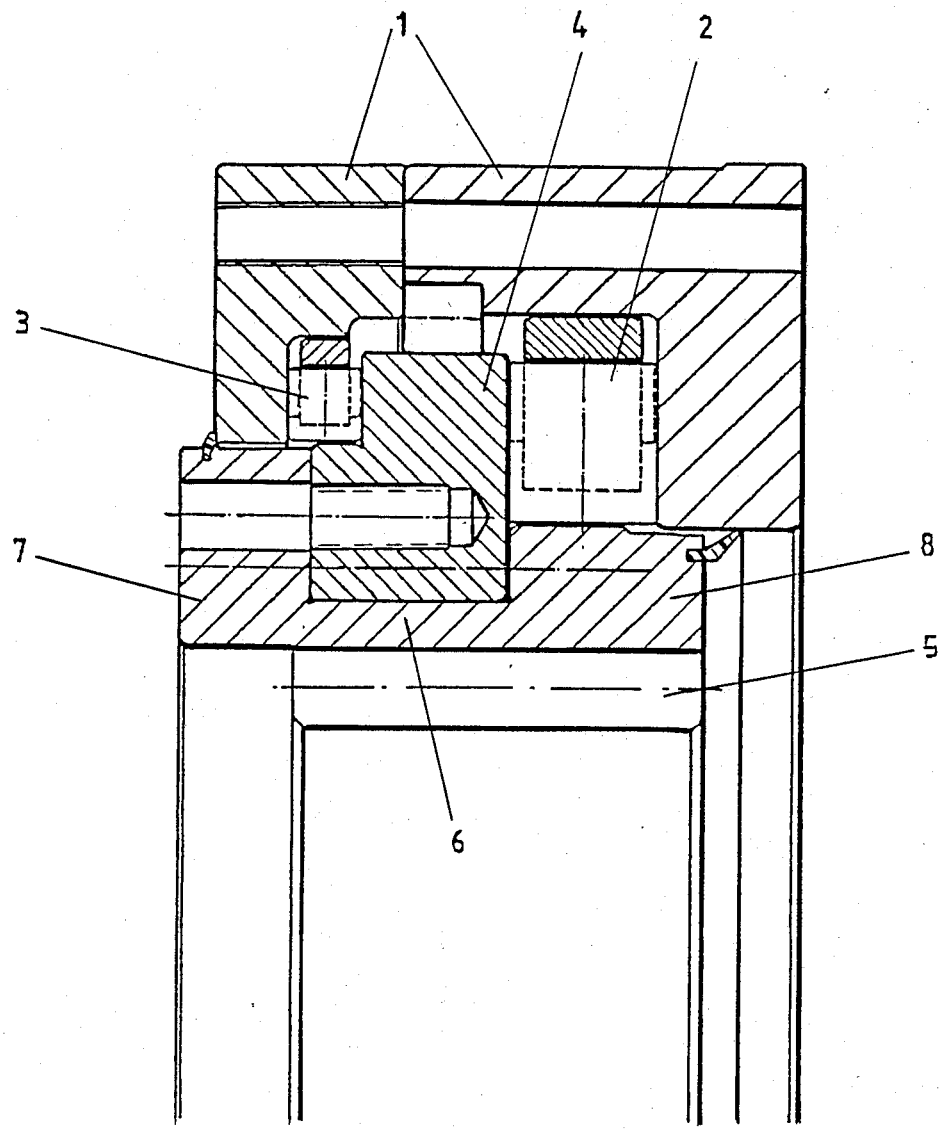
FIG. 1 is a partial cross-section through a bearing in accordance with the invention.

A so-called swing bearing shown in FIG. 1 comprises a bipartite bearing outer ring 1, a main load row of rollers 2, a row of bearing support rollers 3, an inner ring part 4, and a ring part 6 provided on its interior surface with teeth 5. For reasons of manufacture and assembly or transportation, all of the rings and ring parts are comprised of segments which are connected together in position circumferentially shifted with respect to each other.

The axially long teeth 5 on the interior surface of the ring 6 remain highly nondeformable because the ring 6 is developed in U-shape. Ring 6 has radially outwardly extending legs 7 and 8 which are connected to and surround both axial end sides of the inner ring 4 to form a stable unit. The rollers 2 are inside one arm of the U and the rollers 3 are inside the other arm of the U and contact the projecting inner ring 4 there. The double sided fastening of the ring 6 prevents deformation of the teeth 5. The tooth flanks remain at the desired distance from the facing teeth (not shown), and this produces a favorable tooth engagement. The rings 4 and 6 are comprised of partial circumferential segments, which makes their assembly also readily possible. The segments need namely merely be shifted upon assembly. Note that the outer ring is comprised of two ring parts separated across the axis of the bearing with each ring part having partial circumferential segments. The facing segments on the opposite ring parts are attached.

Figure 2:
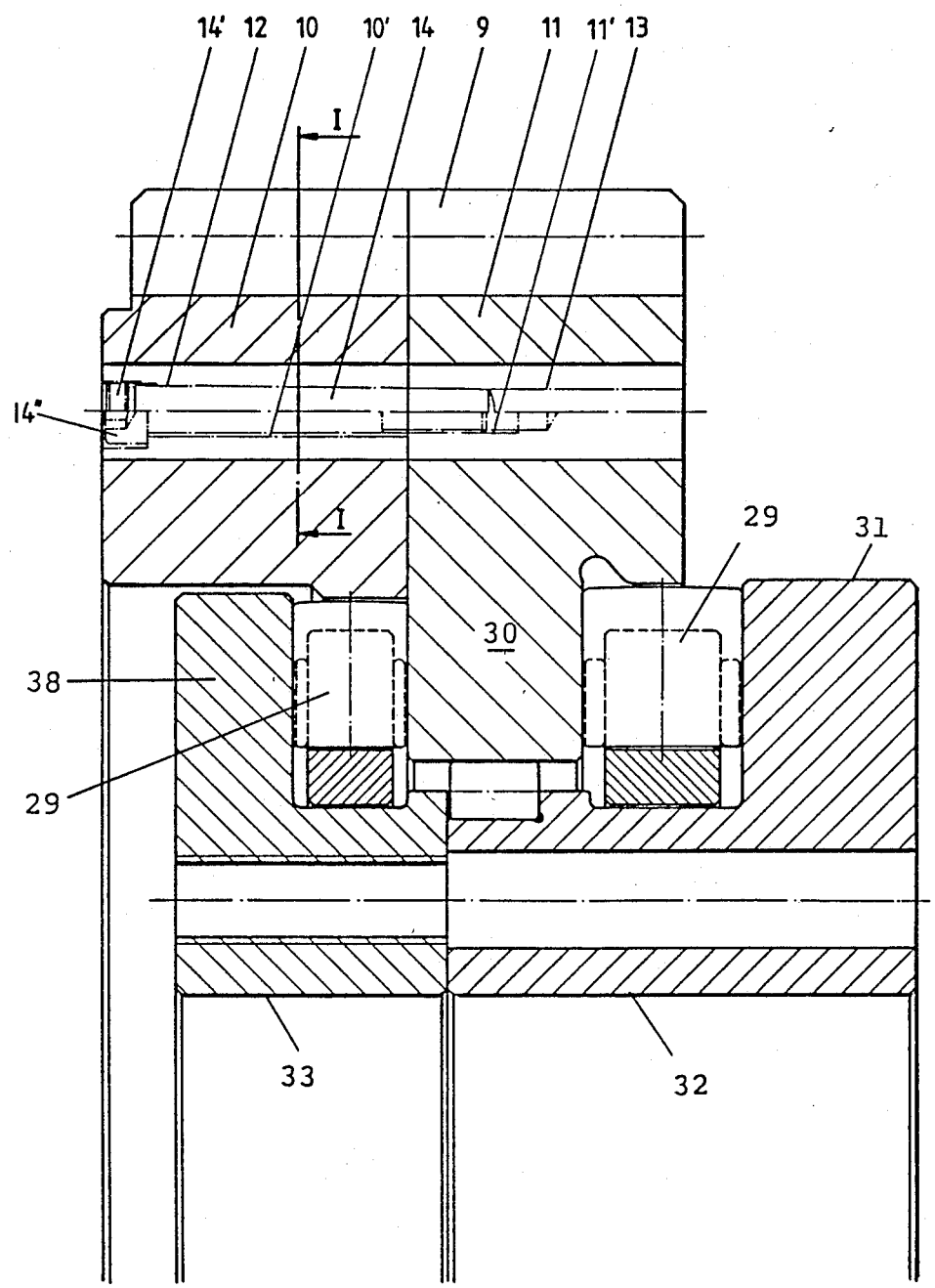
FIG. 2 is a partial cross-section through a second embodiment of a bearing according to the invention.

FIG. 2 shows a second embodiment in which the outer ring, which is provided with external teeth 9, comprises two axially neighboring ring parts 10 and 11 which are divided perpendicular to the axis of rotation. These ring parts are each comprised of segments, and facing segments are circumferentially shifted with respect to each other. Here the toothed ring 10, 11 has an inwardly projecting part 30, while the inner ring 31, which is also in parts 32, 38 which is also in parts 33, a U-shaped ring which encloses the projecting part 30. Note that the rollers 29 are between the arms of the U-shape and the projecting part 30. After axially neighboring segments are connected by screws 14', which are introduced into the holes 10' and 11', the segments form a stable ring embodiment for the teeth 9. Since the segmented ring parts 10 and 11 must retain the most precise position possible with respect to each other, they are also provided with holes 12 and 13 prior to the final machining of the parts. Tapered centering pins 14 are arranged in the holes. The tapered pins 14 are secured by locking screws 14'.

Figure 3:
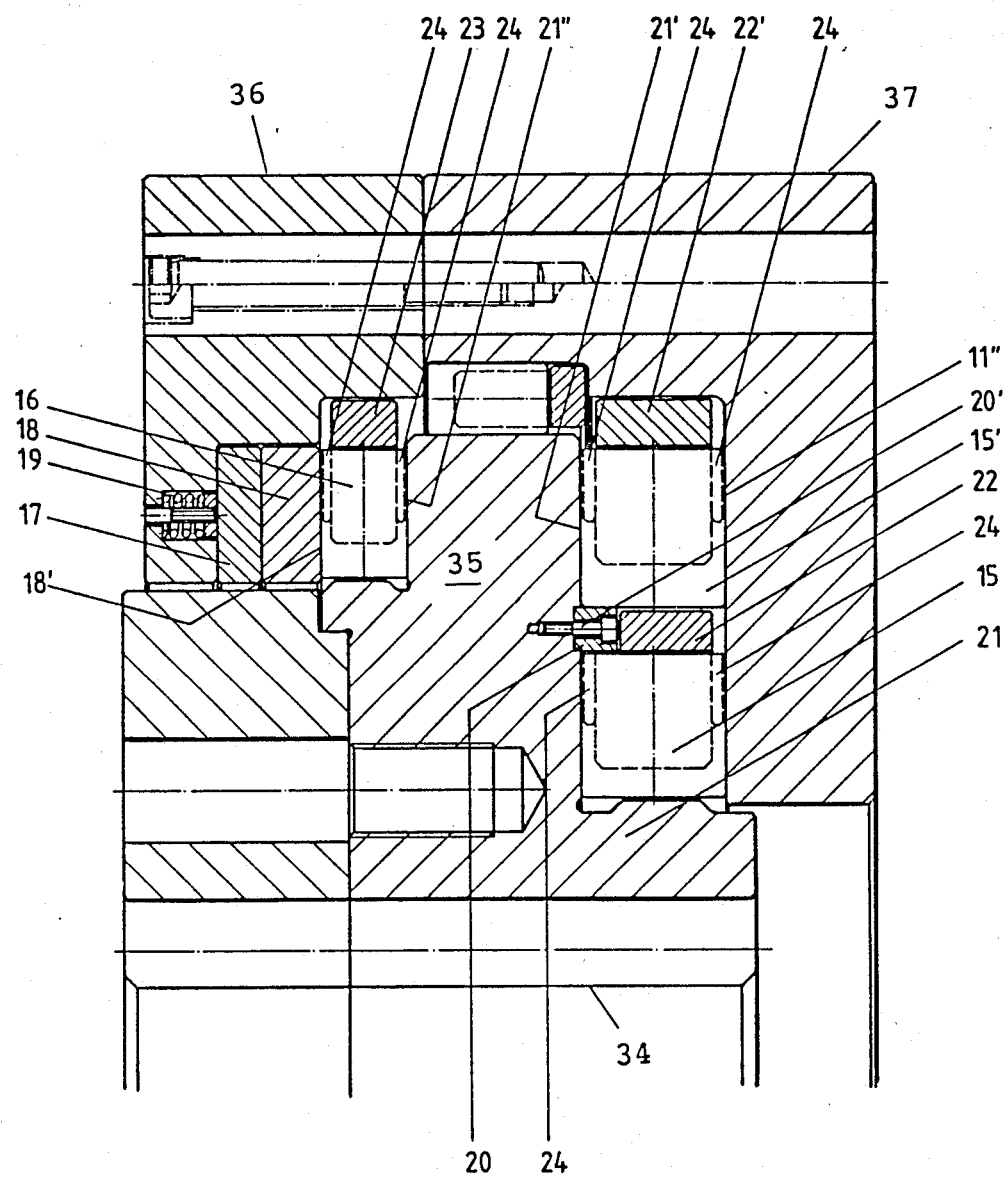
FIG. 3 is a partial cross-section through a third embodiment of a bearing according to the invention.

FIG. 3 shows an embodiment with internal toothing 34 on the inner ring. Here, too, the inner toothed ring 21 has an outwardly projecting part 35 which is captured between the radially inwardly projecting arms of the two parts 36, 37 of the outer ring. The rollers 15, 15' and 16 are between the arms of the U and the projecting part 35. The row of support rollers 16, which lie on the opposite axial side of the bearing from the radially separated rows of main load rollers 15 and 15', travels at one axial side on two segmented ring parts 17 and 18. These ring parts are connected shifted to each other. In order that minimum loading of the row of support rollers 16 is maintained, the rings 17 and 18 are acted on axially by springs 19.

In order to save material and cost of manufacture, separate segmented rim rings 20 are provided between the rows of main load rollers 15 and 15' shown here. Those rim rings are connected via screws 20' to the inner ring 21.

For the better guidance of the cage or separator segments 22, 22' and 23, respectively, on the races 11", 21', 18' and 28", respectively, slide pieces 24 are furthermore provided on both sides.

Figure 4:
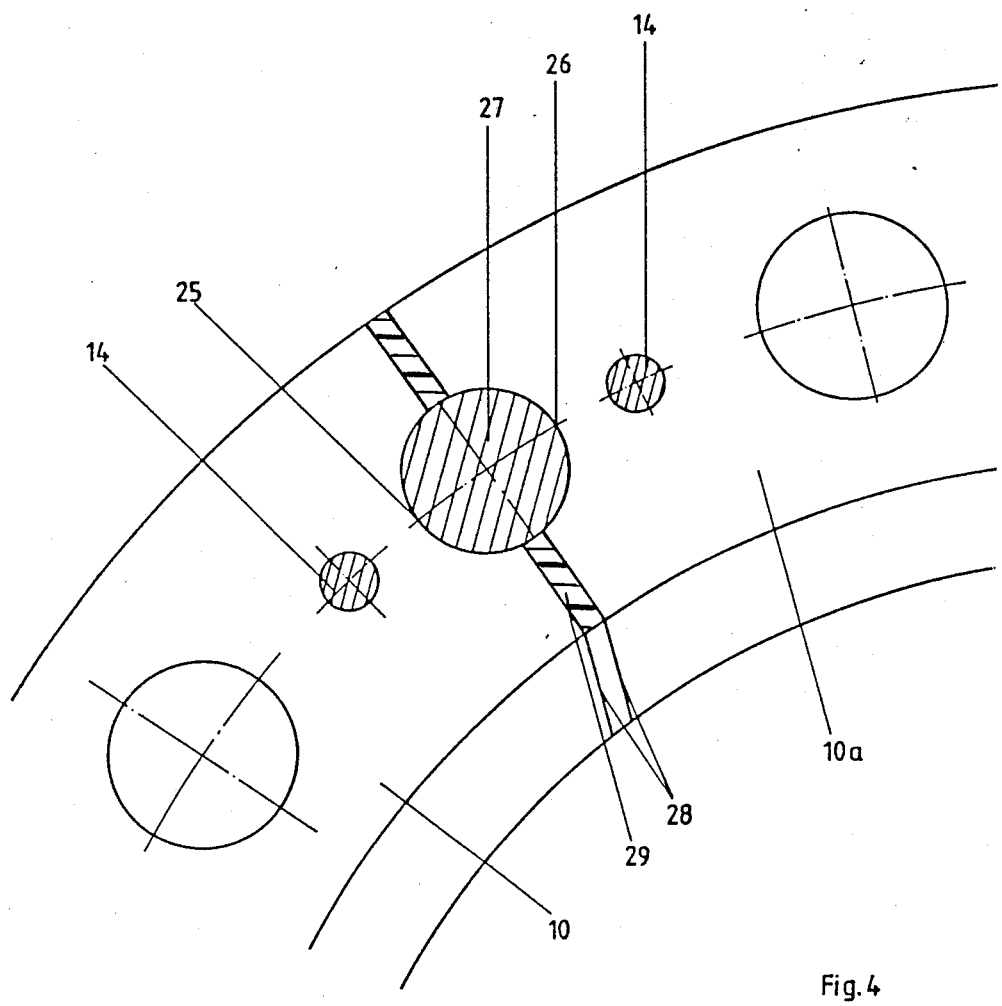
FIG. 4 is a partial view of the circumferential mating joint between segment faces.

Both during the manufacture of the ring parts and in operation, to provide exact positioning of the segment ends with respect to each other, the individual ring segments as shown in FIG. 4 on the example of the segments 10 and 10', are provided at their facing surfaces with circular recesses 25 and 26 in which centering bolts 27 are arranged. The slot 28 that was produced upon the dividing of a closed ring is filled with plastic 29 and therefore also acts as a seal at this place, which had initially been open.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A bearing comprising an outer ring, an inner ring, those rings defining respective bearing races, and rolling elements disposed between the bearing rings; the rolling elements being arranged in respective rows around the bearing;

axially extending teeth being defined on the respective surface of one of the rings that is facing radially away from the other ring;

each of the rings being divided through the axis of the bearing into a plurality of ring parts; each of the ring parts being divided into a plurality of partial circumferential segments; the partial circumferential segments of each of the ring parts of each ring being axially connected to each other in mutually circumferentially shifted position; axially directed connecting means connecting the ring segments of the cooperating plurality of ring parts;

at least one set of cooperating ring parts together being generally U-shaped seen along the axis of the bearing, and at least one of the other ring parts of the other set having a projecting part extending between the arms of the U;

the rolling elements of the bearing being positioned inside the arms of the U-shaped ring parts and outside the projecting part of the other ring parts which projects between the arms of the U.

2. The bearing of claim 1, wherein the ring parts that are provided with the teeth are the parts having the projecting part that projects between the arms of the U.

3. The bearing of claim 2, wherein the ring parts provided with the teeth are divided from each other perpendicular to the axis of rotation.

4. The bearing of claim 1, wherein the ring parts provided with the teeth are divided from each other perpendicular to the axis of rotation.

5. The bearing of claim 1, wherein the connecting means between ring segments of cooperating ring parts comprise axially directed screws.

6. The bearing of claim 1, wherein at least two axially adjacent cooperating segments of a ring part have respective surfaces that face each other; a respective recess defined in each of the facing surfaces and the segments being circumferentially oriented so that the cooperating recesses overlie; centering means disposed in the cooperating recesses for positioning the cooperating circumferentially shifted ring segments.

7. The bearing of claim 6, wherein the cooperating means in the recesses comprises respective centering bolts.

8. The bearing of claim 7, wherein the recesses in the adjacent surfaces further comprise generally radially directed slots in the surfaces which intersect the recesses.

9. The bearing of claim 8, further comprising elastic material to fill in the slots and seal them.

10. The bearing of claim 8, further comprising holes defined in cooperating segments of a respective set of axially adjacent ring parts, and the holes of the cooperating segments being oriented in alignment; and respective centering pins being disposed in the holes for positioning the segments.

11. The bearing of claim 1, further comprising holes defined in cooperating segments of a respective set of axially adjacent ring parts, and the holes of the cooperating segments being oriented in alignment; and respective centering pins being disposed in the holes for positioning the segments.

12. The bearing of claim 11, wherein the centering pins are tapered shaped centering pins.

13. The bearing of claim 1, wherein the rolling elements at one arm of the U-shaped bearing ring parts are main support rollers and the rolling elements at the other arm of the U-shaped parts are secondary support rollers having a smaller bearing capacity.

14. The bearing of claim 13, wherein the main supporting rollers are of larger diameter than the secondary supporting rollers.

15. The bearing of claim 13, wherein the main rollers comprise a pair of the main rollers, with one of the main rollers being radially more outward and the other main roller being radially more inward along the respective arm of the U-shaped ring part.

16. The bearing of claim 15, further comprising a respective rim ring for the radially outer main rollers and that rim ring defining an axial support for the outer rollers; an axial support for the radially inner row of main rollers; the rim ring being connected with the respective bearing part which defines the race for the outer row and inner row of main rollers.

17. The bearing of claim 16, wherein the rim ring is comprised of a plurality of partial circumferential segments.

18. The bearing of claim 13, wherein the arm of the U at the secondary rollers is provided with a secondary race for the secondary rollers and the secondary race comprises two rings, one more axially outward than the other, and the two rings each being comprised of divided ring segments and the ring segments are circumferentially shifted; means applying biasing force to the ring segments urging them toward the support rollers.

19. The bearing of claim 18, wherein the means applying biasing force to the ring segments comprises a spring supported in the respective bearing part on and urged toward the ring segments to press the ring segments toward the secondary support rollers.

20. The bearing of claim 1, further comprising respective cages on each of the rows of rollers and the respective races for the rollers protected by each cage; and slide pieces arranged on at least one side in the gap between the cage segments and races for the rollers.

* * * * *